US009553869B2

(12) United States Patent
Dietrich et al.

(10) Patent No.: US 9,553,869 B2
(45) Date of Patent: *Jan. 24, 2017

(54) METHOD FOR INITIALIZING A MEMORY AREA THAT IS ASSOCIATED WITH A SMART METER (71) Applicant: BUNDESDRUCKEREI GMBH, Berlin (DE)

(72) Inventors: Frank Dietrich, Berlin (DE); Manfred Paeschke, Wandlitz (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 90 days.

This patent is subject to a terminal disclaimer.

(21) Appl. No.: 14/376,660

(22) PCT Filed: Jan. 18, 2013

(86) PCT No.: PCT/EP2013/050907
§ 371 (c)(1),
(2) Date: Aug. 5, 2014

(87) PCT Pub. No.: WO2013/117407
PCT Pub. Date: Aug. 15, 2013

(65) Prior Publication Data
US 2015/0033011 A1 Jan. 29, 2015

(30) Foreign Application Priority Data

Feb. 7, 2012 (DE) .................. 10 2012 201 810
Mar. 2, 2012 (DE) .................. 10 2012 203 356

(51) Int. Cl.
H04L 29/00 (2006.01)
H04L 29/06 (2006.01)
(Continued)

(52) U.S. Cl.
CPC .......... H04L 63/0823 (2013.01); G06F 21/44 (2013.01); G06F 21/57 (2013.01); G06F 21/70 (2013.01);
(Continued)

(58) Field of Classification Search
CPC . H04L 63/0823; H04L 9/3271; H04L 63/0884
See application file for complete search history.

(56) References Cited

U.S. PATENT DOCUMENTS 4,132,981 A * 1/1979 White .................... G01D 4/006
340/10.34
2011/0267202 A1 11/2011 Efthymiou
(Continued)

OTHER PUBLICATIONS

"Protection Profile for the Gateway of a Smart Metering Ssytem", www.bsi.bund.de, XP055059496, Aug. 26, 2011.
"Technische Richtlinie BSI TR-03109 Version 0.20", www.internet-sicherheit.de, XP055059493, Oct. 10, 2011—English text attached.
"Technische Richtlinie BSI TR-03109 Appendix A", www.internet-sicherheit.de, XP055059483, Oct. 10, 2011—English text attached.
"Technische Richtlinie BSI TR-03109 Appendix B", www.internet-sicherheit.de, XP055059481, Nov. 24, 2011—English text not available.
(Continued)

Primary Examiner — Brandon Hoffman
Assistant Examiner — Helai Salehi
(74) Attorney, Agent, or Firm — LEVEQUE INTELLECTUAL PROPERTY LAW, P.C.

(57) ABSTRACT

A method for initializing a memory area associated with a smart meter, establishing a first communication channel between a first computer system and a security module, the security module being associated with a memory area, and the first computer system being associated with a set of computer systems interconnected via a network; authenticating the first computer system with respect to the security module; once the first computer system has been successfully authenticated, the security module receiving data from the first computer system by secure transmission and storage of the data in the memory area in order to initialize the memory area, communication between a second computer system of a utility company and/or operator of the measuring system and the security module being only possible (Continued)

while bypassing the first computer system, owing to the stored data, the second computer system being a computer system of the set of computer systems.

20 Claims, 3 Drawing Sheets

(51) Int. Cl.

| | | |
|---|---|---|
| G06F 21/44 | (2013.01) | |
| G06F 21/57 | (2013.01) | |
| G06F 21/70 | (2013.01) | |
| H04W 4/20 | (2009.01) | |
| H04L 9/32 | (2006.01) | |
| H04W 4/00 | (2009.01) | |

(52) U.S. Cl.
CPC ......... *H04L 9/3271* (2013.01); *H04L 63/0884* (2013.01); *H04W 4/20* (2013.01); *G06F 2221/0706* (2013.01); *G06F 2221/2129* (2013.01); *H04W 4/005* (2013.01); *Y04S 40/24* (2013.01)

(56) References Cited

U.S. PATENT DOCUMENTS

2013/0081113 A1  3/2013  Cherian
2014/0225742 A1  8/2014  Wenger

OTHER PUBLICATIONS

"Technische Richtlinie BSI TR-03109 Appendix C", www.internet-sicherheit.de, XP055059491, Oct. 10, 2011—English text attached.
International Preliminary Report on Patentability, PCT/EP2013/050907, Aug. 21, 2014.
European Patent Office, International Search Report, PCT/EP2013/050907, Apr. 26, 2013.
Barriga et al., "M2M Remote-Subscription Management", www.ericsson.com, XP002686983, May 2, 2011.
"3$^{rd}$ Generation Partnership Project: Technical Specification Group Services and System Aspects: Feasibility Study on the Security Aspects of Remote Provisioning and Change of Subscription for Machine to Machine Equipment (Release 9)", 3GPP Standard, v9.2.0, XP050441986, Jun. 22, 2010.
"ETSI TS 102 689 Machine to Machine Communications—M2M Service Requirements", www.etsi.org, V1.1.1, XP055058237, Aug. 3, 2010.
"ETSI TS 102 690 Machine to Machine Communications—Functional Architecture", www.etsi.org, V1.1.1, XP055057930, Oct. 1, 2011.
"ETSI TS 102 691 Machine to Machine Communications—Smart Metering Use Cases", www.etsi.org, V1.1.1, XP055058238, May 18, 2010.

\* cited by examiner

METHOD FOR INITIALIZING A MEMORY AREA THAT IS ASSOCIATED WITH A SMART METER

PRIORITY CLAIM

This application claims benefit of foreign priority in accordance with 35 U.S.C. 119(b) to German application No. 10 2012 201 810.7 filed Feb. 2, 2012 and German application No. 10 2012 203 356.4 filed Mar. 2, 2012.

CROSS-REFERENCE TO RELATED APPLICATIONS

This application is related to the following co-pending U.S. patent application Ser. No. 14/376,667 entitled "METHOD FOR COMMUNICATION OF ENERGY CONSUMPTION-SPECIFIC MEASUREMENT DATA ELEMENTS BETWEEN A SMART METER DEVICE AND A COMPUTER SYSTEM OF A UTILITY COMPANY AND/OR OPERATOR OF A MEASURING SYSTEM", filed on Aug. 4, 2014, which is incorporated herein in its entirety.

BACKGROUND

The term "smart metering" generally refers to the idea of equipping the customer with electronic energy consumption measuring devices to make additional functionalities available to the customer and the utility company, in addition to the simple acquisition of the amount of energy consumed by a network, for example.

This process makes it possible for a customer to obtain information about actual energy consumption in real time. The term "energy consumption" thereby means the customer's consumption relative to any type of energy that is supplied to households and companies. In addition to the types of energy consisting of electricity, water and gas, this also includes any other types of energy such as, for example, heat from a district heating network.

For capturing energy consumption, intelligent measurement systems, also called intelligent meters or "smart meters" are used by the respective consumer. Smart meters are meters measuring the energy consumed. Thereby, the consumer can be a natural or legal person that uses various measurable types of energy such as electricity, gas, water or heat. The goal of the use of smart meters is the implementation of intelligent measurement systems that would make it possible, for example, to charge variable utilization fees depending on the overall demand and network utilization. As a result, the energy supply networks could be utilized better overall.

BRIEF DESCRIPTION OF THE DRAWINGS

Preferred embodiments will be explained in more detail below with reference to the drawings, in which.

In the following, similar elements are identified by the same reference numbers.

DESCRIPTION

It is known from the technical directive of the Federal Office for Information Security [BSI] TR-03109 that a so-called smart meter gateway, also called concentrator, can be provided as a central communication unit that can communicate with individual or several smart meters. For this purpose, the gateway is able to communicate with devices in a so-called "Home Area Networks" and with devices in a "Wide Area Network". Thereby, the Home Area Network includes all smart meters that are coupled to the gateway such as, for example, consumers' private computers. The private processing units can be used, for example, to provide information about the actual energy values consumed as acquired by the smart meters. The Wide Area Network is designed to enable communication between the gateway and authorized market participants. For example, the gateway can collect the data of all smart meters and make these available at a superordinate collection point, for example, a utility company or a metering point operator.

The invention is based on the objective of providing a method for initializing a memory area that is associated with a smart meter, a software product, a security module and a computer system for initializing a memory area which is associated with a smart meter.

The invention relates to a method for initializing a memory area, whereby the memory area is associated with a smart meter, a software product and a security module, as well as a computer system for initializing a memory area, whereby the memory area is associated with a smart meter.

A method for initializing a memory area is provided, whereby the memory area is associated with a smart meter, whereby the method includes establishing a first communication channel between a first computer system and a security module, whereby the security module is associated with the memory area. The first computer system is thereby associated with a set of computer systems connected by a network. The method further includes authenticating the first computer system to the security module, whereby the initialization makes it possible for the security module to communicate with further computer systems of the set of computer systems, whereby prior to the initialization of the memory area, a successful authentication to the security module is possible only for the first computer system of the set of computer systems. After a successful authentication of the first computer system to the security module, the first computer system receives data by means of the security module via secure transmission and storage of the data in the memory area for an initialization of the memory area, whereby only based on the stored data, communication is enabled between a second computer system of a utility company and/or metering point operator and the security module by bypassing the first computer system, whereby the second computer system is a computer system of the set of computer systems.

Embodiments of the invention could have the advantage that by means of the initialization process a possibility can be provided in a secure, unique and verifiable way, which makes secure communication possible between the smart meter and an authorized market participant such as a utility company or a metering point operator. Preferably, the first computer system is a computer system of a trustworthy instance which is also called "Trusted Service Manager" or "TSM".

Preferably, the security module is configured for this in such a way in the condition as it is supplied to the customer, that after a successful authentication, only this trustworthy instance is able to communicate with the security module exclusively. This ensures that, in particular, a configuration of the smart metering that relates to a charge is allocated only to such a location that is classified as trustworthy by the authorized market participants, i.e. for example, the metering point operators and the actual utility companies, as well as the end consumers. In the following, a "configuration relating to a charge" means that by means of this configuration it is specified relative to the smart meter as to who is, for example, authorized to invoice the amounts of energy acquired by the smart meter. Further, it can thereby also be specified which persons such as end consumers and authorized market participants are even permitted to have access to the functions and information available relating to the smart meter and in what scope. As this specification is made by a trustworthy location, it is thereby ensured that an abuse of these functions and information by unauthorized third parties is precluded. The information can thereby include, for example, location information of the smart meter, values and location information measured by the smart meter and location information of values contained in the memory area.

As the result of storing the data that was received in the memory area for initializing the memory area, it can thus be specified relative to one or several smart meters associated with this memory area, to whom acquired energy amounts will be reported, for example, how the amounts of energy are to be acquired chronologically and which information or "attributes" may be acquired and/or queried by an authorized market participant relative to the smart meter. Further, it can thereby also be specified to what extent an end consumer has access to the information which is stored relative to the smart meter either in the smart meter itself or in a device associated with the smart meter such as a gateway or a security module.

Overall, embodiments of the invention are particularly advantageous because a high degree of trustworthiness of the "configuration data" stored relative to the smart meter is ensured, as well as with respect to the smart meter's acquired measurement data elements for end consumers and also for metering point operators and utility companies.

According to an embodiment of the invention, a secure transmission via end-to-end encryption takes place between the first computer system and the security module. This makes it possible to establish the connection between the security module and the first computer system using any network, because based on the end-to-end encryption, third parties cannot make any changes to the transmitted data via this connection. In general, the invention can be realized thereby, that all communication between the first computer system and the security module can take place over any kind of network. This includes communication by Internet, communication by using wireless communication networks, such as for example, mobile radio communication, and also communication by using a carrier frequency system. The latter is also known by the name of "Power Line Data Transmission", and includes devices for data transmission using available power supply systems.

According to a further embodiment of the invention, the authentication of the first computer system to the security module is established with the help of a certificate of the first computer system. By using this certificate, the security module can then test whether the first computer system has the required authorization for write access to the memory area before such a write access can be executed by the first computer system.

According to a further embodiment of the invention, prior to the initialization of the memory area, a successful authentication to the security module is possible only when a first certificate is present. In this way, for example, only by storing the data in the memory area to initialize the memory area, the security module is given access to communicate with the second computer system whereby on account of the data itself that is stored in the memory area, communication is enabled with the second computer system. It thus is not that any kind of data is written into the memory area that gives access, but it is the content of the data itself that gives access. For example, a specific authorization for the second computer system could be contained in the data, which enables the security module to identify the second computer system as being authorized to access certain measurement data elements or configuration data. It is thereby ensured that in principle, only the trustworthy location in the form of a first computer system is able to start up the security module and thereby the associated smart meter. Thereby, manipulations or even spying attempts are prevented, and without an initial use of the first computer system and thereby a unit that is trusted by all participants, no communication is possible with the security module.

According to a further embodiment of the invention, it is possible only for the first computer system of the set of computer systems to have write access to the memory area exclusively. That would ensure that a non-trustworthy instance would never have write access to the memory area. But it is also possible that this limitation applies only to the period prior to the initialization of the memory area and that after initialization, the write access for other computer systems than the first computer system is limited to, for example, simple write functions that do not affect the basic functionality of the smart meters and/or the gateway. Here, it would be possible to set flags, for example, and to write protocol entries into the memory area. In this case, after initialization, the write access for other computer systems than the first computer system is limited to a non-configured write access. Additionally, the general access control is used here as well, of course, as it is described above relative to the second computer system, and which generally regulates whether the second computer system may access the memory area at all.

According to an embodiment of the invention, the authentication includes a challenge-response process, for example, a cryptographic protocol, for example, based on a symmetric key, or an asymmetric pair of keys can be used to authenticate the first computer system to the security module.

According to an embodiment of the invention, either the memory area and the security module are contained in the smart meter itself, or the memory area and the security module are contained in a smart meter gateway, whereby the smart meter can be coupled to the smart meter gateway. It is possible, for example, that the smart meter and the smart meter gateway are coupled by a wireless and/or a wired communication link.

In all cases, the memory area serves the purpose, among other things, to permanently store such data as certificates and cryptographic keys that ensure a protected, reliable and secure data exchange between the end consumer who operates the smart meter and the utility companies or metering point operators associated with these smart meters.

An advantage results, particularly, in the case in which the memory area is contained in the smart meter gateway, that a single central unit can be provided that provides a single central communication interface for any communications with subscribers that are external to the network of the smart meter smart gateway.

According to an embodiment of the invention, configuration data are associated with the smart meter for operating the smart meter and/or gateway. These configuration data can be stored in the memory area. Configuration data refer to those data of any type that configure the operation of the smart meter and/or gateway. This also includes the type of data acquisition such as, for example, the timing for capturing measurement data, evaluating measurement data, aggregating measurement data, converting measurement data, as well as location-specific data for the smart meter and gateway.

According to an embodiment of the invention, energy-consumption-specific measurement data elements can be acquired by the smart meter. "Measurement data elements" are any kind of data that results from an energy consumption measurement using a smart meter. This includes, for example, a point in time of the acquisition of measurement data of the energy consumption measurement, individual measurement data points at respective points in time, and information about the source of measurement data such as, for example, current intensity, voltage, water pressure, water temperature or gas pressure.

According to an embodiment of the invention, the data received by the first computer system contain a statement about those measurement data elements and/or configuration data that are transmitted to the second computer system by the smart meter or the gateway by using the security module, preferably automatically and which are thus transmitted automatically.

By providing such an authorization concept in the form of "statements", it can be determined specifically for each utility company and/or metering point operator in advance as to which measurement data elements and/or configuration data may be read or acquired at all by this utility company and/or metering point operator. As a result, a high degree of data protection is ensured. Acceptance of such a data protection concept is particularly provided thereby, that the read authorization is authorized by a trustworthy point, namely by the first computer system.

For example, the data received by the first computer system also contain a statement about the chronological frequency of the acquisition of measurement data elements by the smart meter and/or a statement about the chronological frequency of the transmission of the measurement data elements and/or configuration data to the second computer system. Thus, the first computer system can perform a complete basic configuration of the smart meter or the gateway—the end consumer no longer needs to be concerned whether the second computer system performs any unintentional configurations relative to his smart meter.

Preferably, it is the goal to make establishing a second communication channel between a second computer system of the utility company and/or the metering point operator and the security module possible. This is then followed by a reciprocal authentication by the second computer system and the security module, whereby the authentication takes place with the help of a second certificate and with the help of a third certificate of the security module. Subsequent to a successful reciprocal authentication, at least one part of the measurement data elements specified in the data and/or the configuration data are transmitted from the security module to the second computer system via a secure transmission. Alternatively or additionally, it is also possible that in the second certificate, measurement data elements and/or configuration data are likewise specified for which the utility company and/or the metering point operator is authorized for read access. In this case, the transmission of at least one part of the measurement data elements and/or the configuration data specified in the second certificate are additionally or alternatively transmitted by the security module to the second computer system via a secure transmission.

As a result of the cited method it is ensured that measurement data elements and/or configuration data are transmitted exclusively between the second computer system of the utility company and/or metering point operator and the security module, provided the utility company or the metering point operator and end consumer are even interested in such a data transmission, and both sides have previously consented to such a data transmission. Only then will the indicated memory area be furnished with the statements for the second computer system by the trustworthy instance. As the instance of the first computer system is trustworthy, the end consumers can assume that for their smart meters, second computer systems will not give unintentional access by a corresponding storage of the indicated statements in the memory area without consent. If such mutual consent is not present, the utility company or the metering point operator, for example, cannot confirm the authenticity of the third certificate of the security module or the security module is in return not in the position to identify the second certificate of the utility company or the metered point operator as authentic and trustworthy. Preferably, during the initialization of the memory area, the security module can be provided with such information, which would put the security module in a position to be able to confirm the authenticity of the second certificate. However, even if the security module and the utility company or the metering point operator had mutual trust, it is still ensured for the end consumer that the metering point operator or the utility company can only read that data that was previously clearly defined for this purpose as "measurement data elements" and/or "configuration data".

Acceptance of such a data protection concept is given, in particular, thereby that the measurement data elements and/or the configuration data according to one embodiment of the invention are contained additionally or alternatively in an official document, namely a certificate. Because the certificate is tamper-proof and its authenticity can easily be reviewed by the end consumer, thereby as well, an especially high degree of trustworthiness is made possible relative to the communication of the specified measurement data elements and/or configuration data. Preferably, the indicated certificate is in turn signed by the first computer system. The certificate can be the second certificate.

Let it be noted that within the scope of the entire specification, preferably, all certificates should be issued by the operator of the first computer system. Thereby as well, securing the trustworthiness of the first and second computer system and also the security module is ensured.

According to an embodiment of the invention, the second communication channel is established by the security module, whereby the transmission of the part of the data and/or the measurement data specified in the second certificate and/or the configuration data is accomplished by a push method. As a result it is possible that, for example, in the chronologically specified intervals of the security module for the initialization of the memory area, the security module establishes the second communication channel, in order to thereby transmit, for example, energy consumption values to the second computer system at regular intervals. For example, it is thereby also possible that the second communication channel is established only subject to certain conditions specified in the initialization of the memory area. Such conditions can include, for example, an aggregation of the acquired energy amounts above a predetermined threshold value.

According to a further embodiment of the invention, the data received by the first computer system include an energy acquisition application, whereby the energy acquisition application was received in the data from the first computer system via the security module. As a result it is possible in the initialization of the memory area by the first computer system to provide an energy acquisition application, which for example, makes an energy acquisition and an energy accounting possible in a way that is previously specified by the metering point operator and/or the utility company. Moreover, as a result of such an energy acquisition application it could be specified how the energy acquisition is to be accomplished. For example, it can be a statement that is accurate to a split second, or a statement that contains an aggregated energy consumption covering a predetermined period of time. Further, the energy acquisition application can also provide an interface, for example, a web interface, by means of which an end consumer can monitor its energy consumption in a predefined way.

According to an embodiment of the invention, the device contains the information in the form of an associated energy acquisition application, i.e. the energy acquisition application is able to monitor to what extent and whether the second computer system may gain access to the measurement data elements and/or configuration data at all by using corresponding software instructions. Further, these program instructions of the automatic transmission of the measurement data elements to the second computer system can be used as communication interface by utilizing the security module. Further, the energy acquisition application can provide a utility company with a specific user interface for the end consumer that is the user of the security module. Thus, the end consumer can inform itself via this interface, for example, a web interface, about its own consumption-specific details.

According to an embodiment of the invention, the information contained in the data received by the first computer system is contained in the energy acquisition application itself, whereby the energy acquisition application monitors the access of the second computer system to the measurement data elements and/or configuration data with the help of the information. Alternatively or additionally, the information can be contained in a separate file, for example, an authorization table which is accessed by the energy acquisition application to monitor access.

Let it be noted at this point that embodiments of the invention are particularly advantageous then, when the memory area and the security module are contained in a smart meter gateway. In this case it is possible, for example, to couple the smart meter gateway with various smart meters so that during an initialization process, specific energy acquisition applications and/or configuration data can be provided for each smart meter and if necessary, by smart meter, for various utility companies or metering point operators. This also includes once again using the method for initializing the memory area relative to an update of the contents of the memory area, for example, based on an update of an energy acquisition application. Further, this includes the possibility of adding one or more energy acquisition applications to the memory area at a later point in time. As a result, a nearly unlimited possibility of expansion with a number of smart meters and the possibility of access control to the gateway for a number of different utility companies and//or metering point operators is possible due to providing a single gateway. This is particularly relevant for use in, for example, multifamily dwellings in which different subscribers have designated different utility companies or metering point operators at different times or weekdays for providing utility statements and utility supply.

Analogously, the approach described relative to the energy acquisition application can alternatively or additionally also be performed relative to the configuration data and/or the statement itself. This includes, for example, an update of the configuration data by the first computer system and the addition of new configuration data by the first computer system, as well as a change of the authorization concept by the first computer system. It should be ensured that at any point in time any changes, updates or deletion of the authorization or configuration data is possible only by the first computer system exclusively.

According to a further embodiment of the invention, the energy acquisition application initiates the establishment of the second communication channel. As has already been mentioned above, it is thereby possible, to send a message of the acquired amounts of energy to the utility company or the metering point operator in particular, at previously specified intervals. This makes it unnecessary for the utility company or the metering point operator to perform a chronologically sensible query of the acquired energy consumption. If, for example, the energy consumption is reported to the second computer system only then, when a minimum level of energy consumption has been exceeded, the second computer system is thus spared a superfluous query in this case, because the total energy consumption has not yet exceeded this threshold value. Nonetheless, it is of course possible, for example, at regular intervals upon creating a final statement of consumption, that the second computer system establishes communication with the security module and thereby transmits the measurement data elements from the security module to the second computer system.

According to an additional embodiment of the invention, the method further includes establishing a third communication channel between the second computer system and the first computer system, an authentication of the second computer system relative to the first computer system and after successful authentication of the second computer system relative to the first computer system, receiving a request to initialize the memory area from the second computer system via the first computer system, whereby the request includes an identification of the memory area, whereby the identification clearly identifies the memory area.

Thereby it is possible that the second computer system of the utility company or metering point operator initiates the initialization of the memory area by using the first computer system. However, only after the first computer system has classified the second computer system as being trustworthy, will the second computer system establish the first communication channel to the security module and execute the initialization process. Because the second computer system transmits a unique identification of the memory area that is to be initialized to the first computer system, the first computer system is also uniquely able to address exactly that security module that is also actually associated with the desired memory area that is to be initialized. Overall, this process creates a simple and efficient possibility by means of which it can be communicated which smart meters are to be used and configured by the end consumer for data acquisition relative to corresponding metering point operators and/or utility companies.

According to a further embodiment of the invention, the identification of the memory area is given by an identification of the security module. Thereby, it is ensured that the security module and the memory area are inseparably linked with each other. Uniquely addressing the security module thus corresponds to uniquely addressing the memory area. If the memory area is located in a smart meter gateway, this ensures that the gateway cannot subsequently be replaced by a different gateway in an unauthorized way. For example, it could thereby be prevented that a metering point operator provides values from a "hacked" gateway that is only sporadically connected with corresponding smart meters and thereby does not actually perform any real energy consumption acquisition. The aforesaid memory area can be described exclusively via the security module by the first computer system and addressing this memory area is unique, because of the identification. The use of another gateway with another memory area would, in principle, be impossible in this case because the transfer of data relevant for acquiring the energy by the first computer system by would never take place.

According to an embodiment of the invention, the identification of the security module is a public key of the security module, or an IPv6 address of the security module. The use of the public key of the security module as identification of the security module and thus as identification of the memory area has the advantage that thereby, a GUID (Globally Unique Identifier) can be made available having a likelihood of being unique with close to absolute certainty. A simple administration of the identifications would be made possible, for example, by the simple issuance of a public key that is as long as possible. In the case in which the identification of the security module is an IPv6 address, it would be possible in a simple way to uniquely address the security module by using existing networks.

According to a further embodiment of the invention, the third certificate contains the public key of the security module. This public key is thereby associated with a private key that is stored in a protected memory area of the security module. The certificate can have been created according to a Public Key Infrastructure (PKI) standard, for example, according to the X.509 standard.

Let it be noted at this point that the certificates that have been described (first, second and third certificate) do not necessarily have to be stored in a memory of the device provided for this (first computer system, second computer system, security module). Alternatively or additionally, it is also possible to store the certificates in a public directory server.

According to an embodiment of the invention, the security module is inseparably connected with the smart meter or the smart meter gateway. "Inseparable" means a permanent connection between the security module and smart meter or smart meter gateway, which ensures the functioning of the security module. As soon as an attempt is made to remove the security module from the smart meter or the smart meter gateway, the security module transitions into an unusable, i.e. inoperable condition. This can either be ensured by an electronic self-destruction, self-deactivation or a physical destruction or deactivation of the security module during disassembly. In the simplest case, the security module could be molded into a housing of the smart meter or smart meter gateway, so that based on "breaking" this molded connection, the security module is destroyed.

Preferably, based on the connection of the security module with the smart meter or the smart meter gateway, an interlinking process is started in the smart meter or the smart meter gateway, whereby as a result of the interlinking process, an inseparable logical link is established between the security module and the smart meter or the smart meter gateway. For example, this inseparable logical link includes an irreversible copying process of the third certificate or the identification of the security module in the memory area.

According to an embodiment of the invention, the security module is provided in the form of a chip card. For example, the operator of the first computer system could preconfigure the security module in the form of a chip card by storing that kind of information on the chip card that makes it possible to authenticate the first computer system with respect to the security module for performing the initialization process at a later point in time.

According to an embodiment of the invention the first computer system is an officially certified trust center.

A further aspect of the invention relates to a security module, whereby the security module can be assigned to a memory area, whereby the memory area can be assigned to a smart meter, whereby the security module is designed for initializing the memory area, whereby the security module has means for establishing a first communication channel with a first computer system, whereby the first computer system is associated with a set of computer systems connected by a network. Further, the security module has means for authenticating the first computer system with respect to the security module, whereby the initialization is for the purpose of enabling communication by the security module with additional computer systems of the set of computer systems, whereby the security module is designed in such a way that prior to the initialization of the memory area, a successful authentication with respect to the security module is possible only for the first computer system of the set of computer systems. Finally, the security module also has means for receiving data from the first computer system via the security module by means of a secure transmission and storage of the data in the memory area for initializing the memory area after successful authentication of the first computer system with respect to the security module, whereby the security module is designed in such a way that only based on the stored data, communication is enabled between a second computer system of a utility company or metering point operator and the security module by bypassing the first computer system, whereby the second computer system is a computer system of the set of computer systems.

A further aspect of the invention relates to a first computer system for initializing a memory area, whereby the memory area is associated with a smart meter, whereby the first computer system includes:

Means for establishing a first communication channel between the first computer system and a security module, whereby the security module is associated with the memory area, whereby the first computer system is associated with a set of computer systems connected by a network, Means for authenticating a first computer system with respect to the security module, Means for sending data from the first computer system to the security module by secured transmission for storing the data by the security module in the memory area for initializing the memory area after successful authentication of the first computer system with respect to the security module, whereby the data sent specifies a second computer system of a utility company and/or a metering point operator, whereby the specification of access to a communication between the security module and the second computer system is used to bypass the first computer system, whereby the second computer system is a computer system of the set of computer systems.

A further aspect of the invention relates to a method for initializing a memory area that is executed by a first computer system, whereby the memory area is associated with a smart meter, whereby the method performed on the first computer system includes:

establishing a first communication channel between the first computer system and a security module, whereby the security module is associated with the memory area, whereby the first computer system is associated with a set of computer systems connected by a network, authentication of the first computer system with respect to the security module, sending of data from the first computer system to the security module by secured transmission for storing the data by the security module in the memory area for initializing the memory area after a successful authentication of the first computer system with respect to the security module, whereby the data sent specifies a second computer system of a utility company and/or a metering point operator, whereby as a result of the specification, communication access is provided between the security module and the second computer system by bypassing the first computer system, whereby the second computer system is a computer system of the set of computer systems.

A further aspect of the invention relates to a software product containing instructions that can be executed by a processor to execute the method described above.

In the following, similar elements are identified by the same reference numbers.

Figure 1:
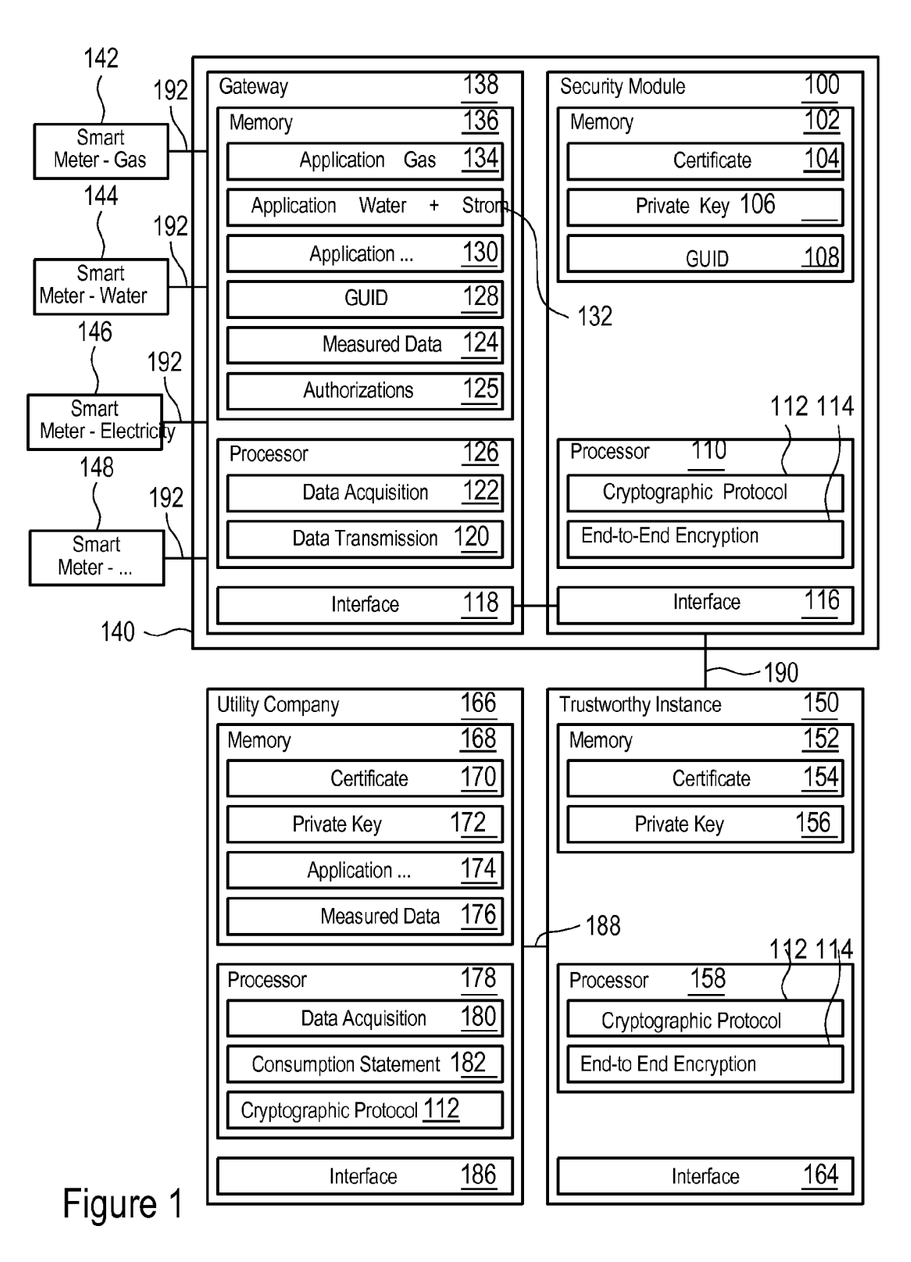
FIG. 1 shows a block diagram of a system for implementing the method described below.
Figure 2:
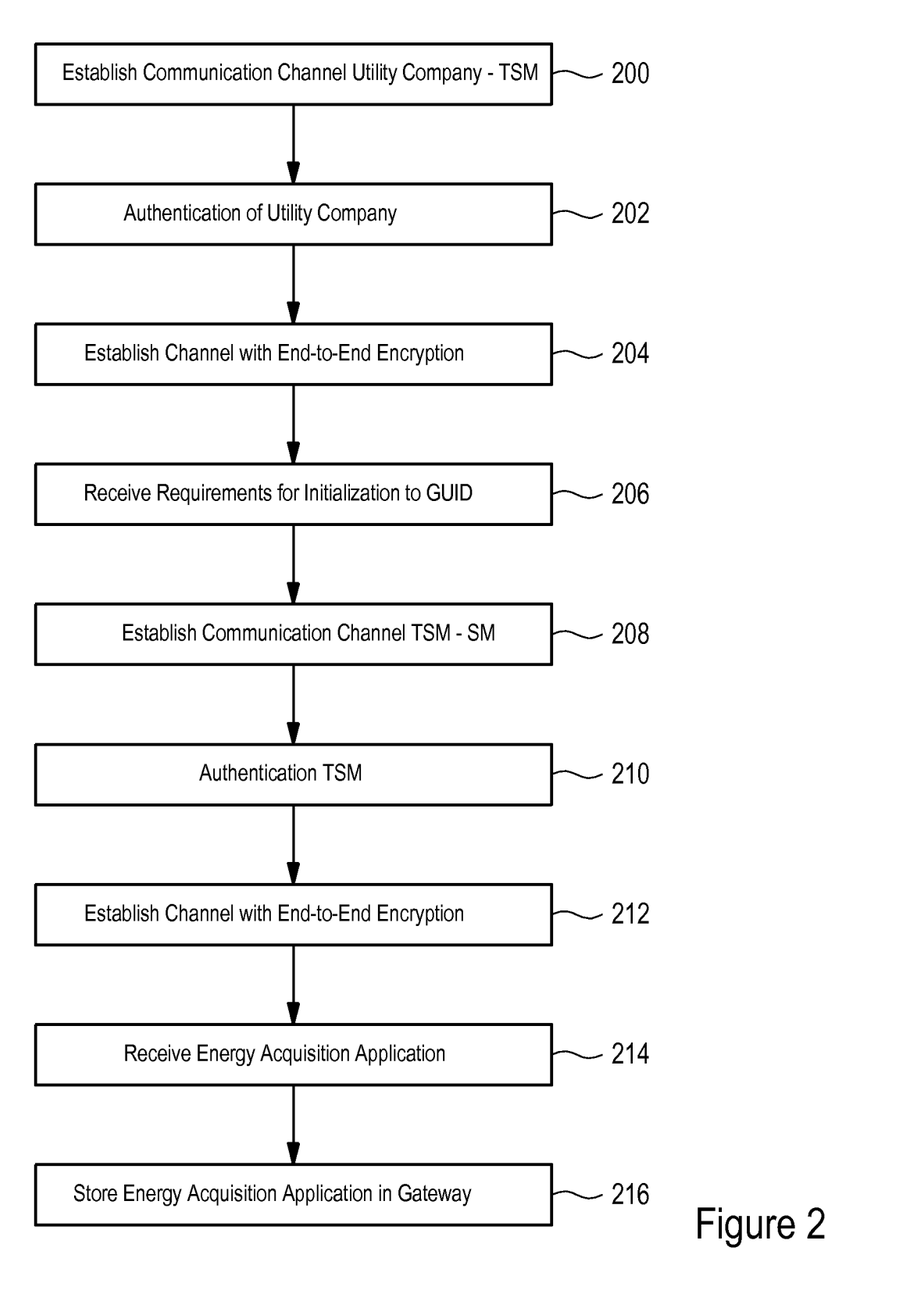
FIG. 2 shows a flowchart of one embodiment of a method for initializing a memory area.

FIG. 1 shows a block diagram of the entire system for initializing a memory area. In conjunction with the method for initializing a memory area that are shown in FIG. 2, the following is intended to show how a memory area 136 of a gateway 138 that is assigned to a number of smart meters 142, 144, 146, 148, can be initialized, without limiting the generality.

Smart meters 142 through 148 thereby serve to acquire various energy consumption values relative to the example of gas (smart meter 142), water (smart meter 144), electricity (smart meter 146) and other forms of energy not specified any further (smart meter 148). The smart meters are thereby connected with interface 118 of gateway 138 via corresponding communication links 192.

Let it be assumed that a security module 100 is firmly and inseparably connected with gateway 138, so that overall, an inseparable unit 140 results from the combination of gateway 138 and security module 100. Gateway 138 and security module 100 communicate with each other via respective interfaces 118 or 116. Further, via interface 116, communication takes place with authorized market participants and third parties or instances that are not located within the network formed by unit 140 and smart meters 142 through 148. The communication between interface 116 of security module 100 and further communication participants thereby occurs via a communication link 190. This can, for example, be a power line connection or a communication link via a mobile telecommunication network or the Internet.

Security module 100 has an electronic memory 102 with protected memory area 106 and 108. Protected memory area 106 is used to store a private key of security module 100 and memory area 108 serves to store an identification of the security module "GUID" (Globally Unique Identifier). A GUID can, for example, be an IPv6 address of security module 100.

The electronic memory 102 can also have a memory area 104 for storing a certificate. The certificate contains a public key that is assigned to the private key stored in protected memory area 106. The certificate can have been prepared according to a Public Key Infrastructure (PKI) standard, for example, according to the X.509 standard. It is not mandatory to store the certificate with electronic memory 102 of security module 100. Alternatively or additionally, the certificate can also be stored in a public directory server.

Security module 100 has a processor 110 for executing software instructions 112 and 114. To execute software instructions 112 "cryptographic protocol" an authentication of a trustworthy instance 150, or a utility company 166 is made possible relative to security module 100, for example. An example of the cryptographic protocol can be a challenge-response protocol based on a symmetric key, or an asymmetric pair of keys.

Of course, a reciprocal authentication of security module and trustworthy instance or utility company is also possible.

Software instructions 114 serve the end-to-end encryption of data that is to be transmitted between security module 100 and trustworthy instance 150 or utility company 166. A symmetric key can be used for end-to-end encryption for the execution of the cryptographic protocol between security module 100 that is agreed to with the other providers 150 or 166.

Similar to security module 100, trustworthy instance 150 also has an electronic memory 152 and a protected memory area 156 for storing the private key of the trustworthy instance. A certificate 154 of the trustworthy instance can also be contained in memory 152. This certificate can, however, also be stored in a central certificate server.

A processor 158 of trustworthy instance 150 in turn has the software instructions 112 and 114 for implementing a cryptographic protocol and for executing an end-to-end encryption as described above relative to security module 100. The cryptographic protocol and the end-to-end encryption can be used for communicating with utility company 166 via interface 164, or with security module 100. Certificate 154 in turn contains a public key that is assigned to the private key stored in the protected memory area 156.

A "utility company" 166 is a computer system of the utility company, which in turn has an electronic memory 168 and a processor 178. Further, this computer system is assigned to an interface 186 by means of which communication is made possible with the trustworthy instance 150 or the security module.

Electronic memory 168 of utility company 166 has a protected memory area 172 having a private key, whereby the private key is assigned to a public key which is likewise contained in a certificate 170 in electronic memory 168. Further, in memory 168 a memory area is provided for one or several applications, whereby these applications make it possible to configure gateway 138 relative to charges. Likewise, in electronic memory 168, measurement data 176 can be stored that was previously received by gateway 138.

Processor 178 has software instructions 180 for acquiring the consumption data supplied by gateway 138, and further, optional to the performance of the method, for a statement of consumption depending on the measurement data (software instructions 182) that was determined. The software instructions for executing a cryptographic protocol 112, as well as software instructions—not shown—for executing an end-to-end encryption can likewise be provided, whereby these software instructions enable secure communication with trustworthy instance 150 or security module 100.

If a new customer should now be associated with utility company 166, after a first installation of smart meters 142 through 148, for example, and making gateway 138 with security module 102 available, an initialization process of the security module could take place. This initialization process could be initiated thereby, that the new customer (an end consumer), or a certain technical instance that had installed the smart meters, provides a corresponding message to utility company 166. This message should preferably include GUID 108 of security module 100, because thereby, a unique identification of security module 100 is possible with respect to utility company 166.

After a utility company 166 has received this message via its interface 186, for example, via a web interface of a corresponding website, utility company 166 establishes a communication channel with trustworthy instance 150. This is marked with reference number 200 in FIG. 2. The trustworthy instance can hereby be a so-called "Trusted Service Manager TSM", for example, i.e. an officially certified instance which certifies the respective identity of the communication partner by means of electronic communication processes.

Subsequent to establishing the communication channel in Block 200, an authentication of utility company 166 takes place in Block 202. For this, certificate 170 of the utility company is tested by trustworthy instance 150. For example, trustworthy instance 150 can execute challenge-response processes upon a positive test of the certificate, in which a random number is generated which is encrypted with the public key of utility company 166 that is contained in certificate 170, and transmitted to utility company 166. Thereupon, utility company 166 can decrypt the random number with its private key 172, and return it in clear text. If the random number received by trustworthy instance 150 agrees with the random number previously described, the authenticity of utility company 166 is positively ensured.

After performing the action of Block 202 and the optional challenge-response process, in Block 204, a channel with end-to-end encryption can then be established via communication link 188 between utility company 166 and trustworthy instance 150. Hereby, software instructions 114 of processor 158 of the trustworthy instance can be used.

After establishing the channel in Block 204, in Block 206, the trustworthy instance 150 receives a request to deploy an energy acquisition application 174 of utility company 166 and memory 136 of gateway 138. In order to specify memory 136 or gateway 138 uniquely, together with the request to initialize memory 136, GUID 128 of gateway 138, which is contained in memory 136, is also transmitted to the trustworthy instance. Preferably, GUID 128 of memory 136 is identical with GUID 108 of memory 102 of security module 100.

Upon receiving the GUID in Block 206, trustworthy instance 150 is enabled to uniquely address desired gateway 138 to deploy application 174. For this, in a next Block 208, the trustworthy instance 150 establishes a communication channel to security module 100 via communication link 190. Trustworthy instance 150 authenticates itself to security module 100, whereby the authentication in turn includes a challenge-response process by security module 100 in addition to a test of certificate 154 by the security module. For this, security module 100 could in turn generate a random number, encrypt with the public key of trustworthy instance 150 and send it to trustworthy instance 150. Trustworthy instance 150 would decrypt the encrypted random number with its private key 156 and send the decrypted random number back to security module 100 in clear text. If the security module finds that the decrypted random number received agrees with its originally encrypted random number, an authentication of the trustworthy instance is given.

The method then continues in Block 212, namely the establishment of a communication channel with end-to-end encryption between trustworthy instance 150 and security module 100. This can in turn be accomplished by using software instructions 114 of processor 110 of security module 100.

In Block 214, security module 100 receives energy acquisition application 174 from the trustworthy instance.

Let it be noted at this point that it can be advantageous when, for example, the trustworthy instance stores the most frequently sent energy acquisition applications in a local memory of the trustworthy instance so that it is not necessary to continually transmit applications 174 from utility company 166 to trustworthy instance 150 when new customers are set up.

After receiving the energy acquisition application in Block 214, security module 100 stores the application in memory 136 of gateway 138. Should application 174 be an application for acquiring energy consumption relative to water and electricity, for example, the application is stored as application 132 in memory 136. This application is in a position to process energy consumption data from smart meter 144. Analogous to this, memory 136 can include corresponding applications for the energy acquisition of gas (134) and further applications 130 for acquiring other types of energy. Block 216 in FIG. 2 shows storage of the energy acquisition application by security module 100 in gateway 138.

In addition to receiving the energy acquisition application in Block 214 via security module 100, it is also possible that separate information in the form of utility company-specific authorizations or precise specifications of measurement data elements are received by trustworthy instance 150, which are likewise stored in a further area 125 of memory 136. These authorizations or specifications of measurement data elements make it possible to determine in advance which information of utility company 166 may even be received by gateway 138. For this it is possible, for example, that specific authorizations are defined in advance for each utility company by the trustworthy instance 150 that apply globally to all utility companies 166 and which are generally transmitted by energy acquisition applications to the security module and thus to gateway 138.

It is likewise possible that configuration data are received by trustworthy instance 150. These configuration data can thereby relate to the technical configuration of the smart meters and/or the gateway.

In place of or in addition to these authorizations or specifications in the form of separate information, it is also possible to implement these authorizations or specifications in the energy acquisition application itself. Thus, with the help of its software instructions, the application automatically controls which data will be communicated to utility company 166.

By means of the software instructions for data acquisition 122 of processor 126, gateway 138 is now able to acquire measurement data relative to an energy consumption, for example, from smart meter 144 and smart meter 146. The corresponding measurement data are stored in memory area 124 of memory 136. In principle, measurement data 124 consist of various measurement data elements that can, for example, include: the time of acquisition of the measurement data, individual measurement data points at respective points in time, information about the underlying source of the measurement data (e.g. current intensity, voltage, water pressure, water temperature, gas pressure). Measurement data 124 can be subjected to a further evaluation by applications 130, 132 and 134, from which analyzed measurement data result, which can also be stored as "measurement data elements" in memory area 124. For example, analyzed measurement data can consist of accumulated energy consumption values.

Authorizations 125 or the specifications of the measurement data elements described above make it possible to determine in advance as to which measurement data elements 124 may even be retrieved by utility company 126, or which of these measurement data elements 124 should even be communicated to utility company 126. Furthermore, this makes it possible to specify in advance how much detail is permitted for such a retrieval. For example, a retrieval of the measurement data 124 that is too detailed and split-second precise could be objectionable, as short intervals of measurements provide insights into the utilization of electrical devices and as a result, user profiles can be created which may, however, not be of any interest to the end customer.

As has already been mentioned above, preferably, security module 100 and gateway 138 are inseparably connected with each other. For example, these form an integrated unit 140 as shown schematically in FIG. 1. In order to create this unit 140, the method explained in the flow chart of FIG. 3 can be performed.

Figure 3:
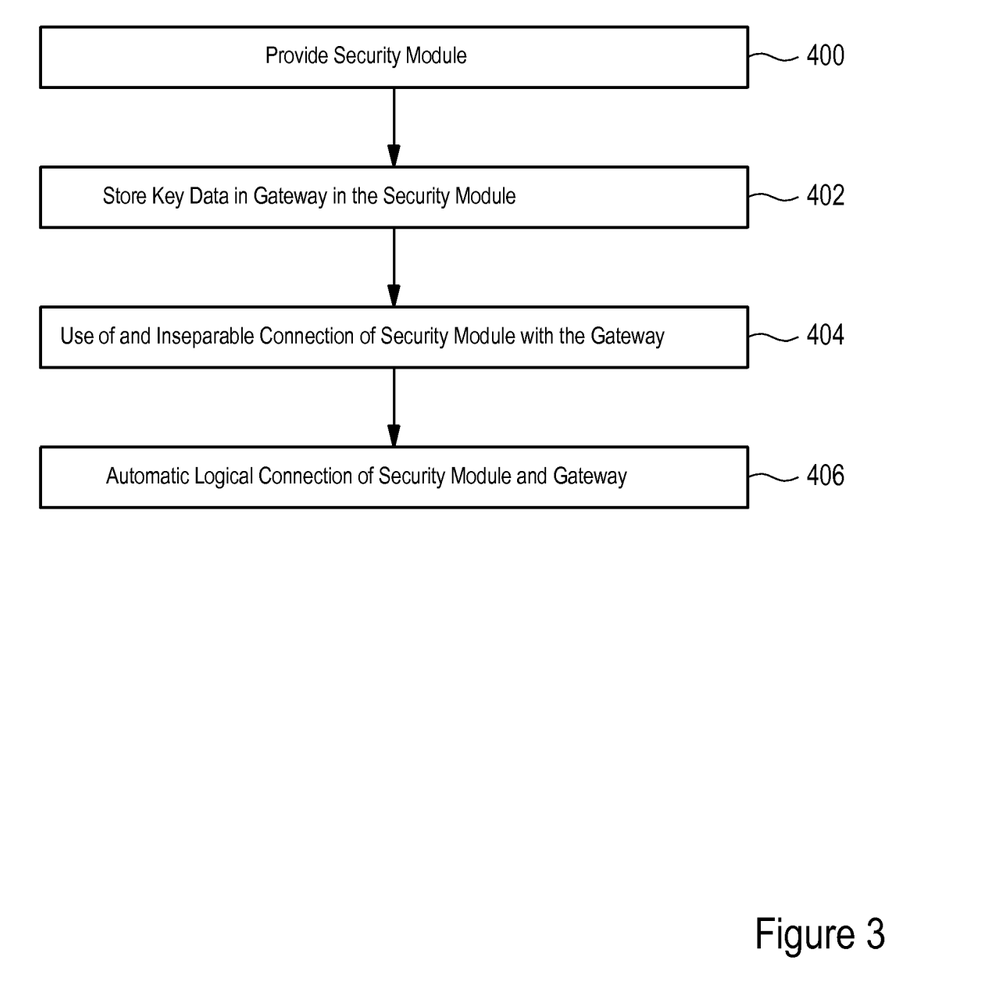
FIG. 3 shows a flowchart of a method for providing a security module.

In Block 400, first, security module 100 is made available. Thereupon the storing of key material and certificates in the security module follows in Block 402. For example, for this, the security module could be provided with a corresponding cryptographic unit, by means of which private key 106 is automatically generated. Alternatively, it is also possible that the trustworthy instance generates the private key and stores it in the security module in a memory area that is not accessible from the outside. The public key that pertains to the private key is attached to the certificate, which is then signed by the trustworthy instance and stored in memory 102 of the security module.

After that, in Block 404, the security module is inserted in the gateway, for example, in the form of a chip card and an inseparable connection of security module and gateway is established. For example, the security module and the gateway could be coupled electronically in such a way that a removal of the security module from the gateway would lead to an automatic destruction of the security module.

After inserting the security module into gateway 404, an automatic logical link between security module 100 and gateway 138 is established. For example, this could be accomplished thereby, that GUID 108 of the security module is irreversibly written into memory 136 of gateway 138 as GUID 128. Hereby, it should be ensured by security module 100, for example, that any communication with gateway 138 to provide measurement data elements [and] via utility company 166 takes place only then, when an identity of GUID 108 and 128 is present.

A method for initializing a memory area, the memory area being associated with a smart meter, and the method including: establishing a first communication channel between a first computer system and a security module, the security module being associated with a memory area, and the first computer system being associated with a set of computer systems interconnected via a network; authenticating the first computer system with respect to the security module, the initialization serving to enable communication of the security module with other computer systems of the set of computer systems, and a successful authentication with respect to the security module prior to initialization of the memory area exclusively being possible for the first computer system of the set of computer systems; once the first computer system has been successfully authenticated with respect to the security module, the security module receiving data from the first computer system by way of secure transmission and storage of the data in the memory area in order to initialize the memory area, communication between a second computer system of a utility company and/or operator of the measuring system and the security module being only possible while bypassing the first computer system, owing to the stored data, the second computer system being a computer system from among of the set of computer systems.

Some aspects and features of the disclosed embodiments are set out in the following numbered items:

1. A method for initializing a memory area (136), wherein the memory area (136) is associated with a smart meter (142; 144; 146; 148), wherein the method comprises:

establishing a first communication channel between a first computer system (150) and a security module (100), wherein the security module (100) is associated with the memory area (136), wherein the first computer system (150) is associated with a set of computer systems connected by a network, authenticating the first computer system (150) with respect to the security module (100), wherein the initialization serves the purpose of enabling communication between the security modules (100) and further computer systems (166) of the set of computer systems, wherein prior to the initialization of the memory area (136) a successful authentication with respect to the security module (100) is possible exclusively for the first computer system (150) of the set of computer systems, after successfully authenticating the first computer system (150) with respect to the security module (100), receiving data from the first computer system (150) by means of the security module (100) by secure transmission and storage of the data in the memory area (136) for initializing the memory area (136), wherein only based on the stored data, a communication by a second computer system (166) of a utility company and/or metering point operator and the security module (100) is made possible by bypassing the first computer system (150), wherein the second computer system (166) is a computer system of the set of computer systems.

2. A method as recited in claim 1, wherein the secure transmission is accomplished by an end-to-end encryption between the first computer system (150) and the security module (100).

3. A method as recited in claim 1 or 2, wherein authenticating the first computer system (150) with respect to the security module (100) is accomplished with the help of a first certificate (154) of the first computer system (150).

4. A method as recited in claim 3, wherein prior to the initialization of the memory area (136) a successful authentication with respect to security module (100) is possible only when a first certificate (154) is present.

5. A method as recited in one of the preceding claims, wherein only as a result of the storage of data in the memory area (136) for initializing the memory area (136), the security module gains access to communicate with the second computer system (166), wherein as a result of the data itself that is stored in the memory area, communication access is made possible with the second computer system (166).

6. A method as recited in one of the preceding claims, wherein write access to memory area (136) is possible exclusively for the first computer system (150) of the set of computer systems.

7. A method as recited in one of the preceding claims, wherein the authentication comprises a challenge-response process.

8. A method as recited in one of the preceding claims, wherein
the memory area (136) and the security module (100) are contained in the smart meter (142; 144; 146; 148), or
the memory area (136) and the security module (100) are contained in a smart gateway (138), wherein the smart meter (142; 144; 146; 148) can be coupled to the smart meter gateway (138).

9. A method as recited in claim 8, wherein the smart meter is associated with configuration data for operating the smart meter and/or the gateway, wherein by means of the smart meter (142; 144; 146; 148) energy consumption-specific measurement data elements can be acquired, wherein the data received by the first computer system (150) contains a statement (125) of those measurement data elements and/or configuration data to which the utility company and or the metering point operator is authorized for read access.

10. A method as recited in claim 9, wherein the data received by the first computer system (150) contains a statement (125) of those measurement data elements and/or configuration data which are transmitted to the second computer system (166) by the smart meter or the device by using the security module.

11. A method as recited in one of the preceding claims 9 through 10,
wherein the data received by the first computer system (150) contain a statement (125) concerning the chronological frequency of capturing the measurement data elements by the smart meters (142; 144; 146; 148) and/or a statement (125) about the chronological frequency of the transmission of the measurement data elements and/or configuration data to the second computer system (166).

12. A method as recited in one of the preceding claims, wherein the data received by the first computer system (150) include an energy acquisition application (130; 132; 134; 174).

13. A method as recited in claim 12, wherein the device is associated with the statement (125) in the form of the energy acquisition application (130; 132; 134; 174).

14. A method as recited in claim 13, wherein the statement (125) is contained in the data received by the first computer system (150) in the energy acquisition application, wherein the energy acquisition application (130; 132; 134; 174) monitors the access by the second computer system (166) to the measurement data elements and/or configuration data with the help of statement (125).

15. A method as recited in one of the preceding claims, furthermore, further comprising: establishing a third communication channel between the second computer system (166) and the first computer system (150),
authenticating the second computer system (166) with respect to the first computer system (150), after successfully authenticating the second computer system (166) with respect to the first computer system (150), receiving a request to initialize the memory area (136) from the second computer system (166) by means of the first computer system, wherein the request comprises an identification (108; 128) of the memory area (136), wherein the identification (108; 128) uniquely identifies the memory area (136).

16. A method as recited in claim 15, wherein the identification (108; 128) of the memory area (136) is provided by an identification (108; 128) of security module (100).

17. A method as recited in claim 16, wherein the identification (108; 128) of the security module (100) is a public key of the security module (100), or an IPv6-address of the security module (100).

18. A security module (100), wherein the security module (100) can be associated with a memory area (136), wherein the memory area (136) can be associated with a smart meter (142; 144; 146; 148), wherein the security module (100) is designed for initializing the memory area (136), wherein the security module (100) furthermore has:
means for establishing a first communication channel with a first computer system (150), wherein the first computer system (150) is associated with a set of computer systems connected by a network,
means (112) for authenticating the first computer system (150) with respect to the security module (100), wherein the initialization serves to enable communication between the security module (100) and additional computer systems (166) of the set of computer systems, wherein the security module (100) is designed in such a way, that prior to the initialization of the memory area (136), a successful authentication with respect to the security module (100) is possible only for the first computer system (150) of the set of computer systems,
means (116) for receiving data from the first computer system (150) by means of the security module (100) via a secure transmission and storage of data in memory area (136) for initializing memory area (136) after successful authentication of the first computer system (150) with respect to the security module (100), wherein the security module (100) is designed in such a way that only based on the stored data, communication is enabled between a second computer system (166) of a utility company (166) and/or metering point operator and the security module (100) by bypassing the first computer system (150), wherein the second computer system (166) is a computer system belonging to a set of computer systems.

19. A security module (100) as recited in claim 18, wherein the security module (100) is a chip card.

20. A first computer system for initializing a memory area (136), wherein the memory area (136) is associated with a smart meter (142; 144; 146; 148), wherein the first computer system (150) comprises:
means for establishing a first communication channel between the first computer system (150) and a security module (100), wherein the security module (100) is associated with the memory area (136), wherein the first computer system (150) is associated with a set of computer systems connected by a network,
means (112) for authenticating the first computer system (150) with respect to the security module (100),
means (164) for transmitting data from the first computer system (150) to the security module (100) via a secure transmission for storing the data by the security module (100) in the memory area (136) for initializing the memory area (136) after successful authentication of the first computer system (150) with respect to the security module (100), wherein the data that are transmitted specify a second computer system (166) of a utility company and/or a metering point operator, wherein the specification of providing access to a communication between the security module (100) and the second computer system (166) has the purpose of bypassing the first computer system (150), wherein the second computer system (166) is a computer system of a set of computer systems.

21. A method executed on a first computer system for initializing a memory area (136), wherein the memory area (136) is associated with a smart meter (142; 144; 146; 148), wherein the method on the first computer system (150) comprises:

establishing a first communication channel between the first computer system (150) and a security module (100), wherein the security module (100) is associated with the memory area (136), wherein the first computer system (150) is associated with a set of computers connected by a network, authenticating the first computer system (150) with respect to the security module (100), sending data from the first computer system (150) to the security module (100) via a secure transmission for storing the data by the security module (100) in the memory area (136) for initializing the memory area (136) after successful authentication of the first computer system (150) with respect to the security module (100), wherein by means of the data transmitted, a second computer system (166) of a utility company and/or metering point operator is specified, wherein as a result of the specification, access is granted for a communication between the security module (100) and the second computer system (166) by bypassing the first computer system (150), wherein the second computer system (166) is a computer system of a set of computer systems.

22. A software product containing instructions that are executable by a processor for the purpose of performing the method as recited in one of the preceding claims.

REFERENCE NUMBERS

100 Security module
102 Memory
104 Certificate
106 Private key
108 GUID
110 Processor
112 Cryptographic protocol
114 End-to-end encryption
116 Interface
118 Interface
120 Data transmission
122 Data acquisition
124 Measurement data
125 Authorization
126 Processor
128 GUID
130 Application
132 Application
134 Application
136 Memory area
138 Memory
140 Unit
142 Smart meter
144 Smart meter
146 Smart meter
148 Smart meter
150 Trustworthy instance/First computer system
152 Memory
154 Certificate
156 Private key
158 Processor
164 Interface
166 Computer system of a utility company
168 Memory
170 Certificate
172 Private key
174 Application
176 Measurement data
178 Processor
180 Data acquisition
182 Statement of consumption
186 Interface
188 Communication link
190 Communication link
192 Communication link

What is claimed is:

1. A method for initializing a memory area, wherein the memory area is associated with a smart meter, wherein the method comprises:

establishing a first communication channel between a first computer system and a security module, wherein the security module is associated with the memory area, wherein the first computer system is associated with a set of computer systems connected by a network;

authenticating the first computer system with respect to the security module, wherein initialization serves the purpose of enabling communication between the security modules and further computer systems of the set of computer systems, wherein prior to the initialization of the memory area a successful authentication with respect to the security module is possible exclusively for the first computer system of the set of computer systems; and after successfully authenticating the first computer system with respect to the security module, receiving data from the first computer system via the security module by secure transmission and storage of the data in the memory area for initializing the memory area, wherein only based on the stored data, a communication by a second computer system of a utility company and/or metering point operator and the security module is made possible by bypassing the first computer system, wherein the second computer system is a computer system of the set of computer systems, wherein, prior to and subsequent to communication by the second computer system of the utility company and/or metering point operator and the security module being made possible, write access to memory area is possible exclusively for the first computer system of the set of computer systems.

2. The method according to claim 1, wherein the secure transmission is accomplished by an end-to-end encryption between the first computer system and the security module.

3. The method according to claim 1, wherein authenticating the first computer system with respect to the security module is accomplished with the help of a first certificate of the first computer system.

4. The method according to claim 1, wherein only as a result of the storage of data in the memory area for initializing the memory area, the security module gains access to communicate with the second computer system, wherein as a result of the data itself that is stored in the memory area, communication access is made possible with the second computer system.

5. The method according to claim 1, wherein the authentication comprises a challenge-response process.

6. The method according to claim 1, wherein
the memory area and the security module are contained in the smart meter, or
the memory area and the security module are contained in a smart gateway, wherein the smart meter can be coupled to the smart meter gateway.

7. The method according to claim 1, wherein the data received from the first computer system includes an energy acquisition application.

8. The method according to claim 1, wherein the method further comprises:
establishing a third communication channel between the second computer system and the first computer system;
authenticating the second computer system with respect to the first computer system; and
after successfully authenticating the second computer system with respect to the first computer system, receiving a request to initialize the memory area from the second computer system by way of the first computer system, wherein the request comprises an identification of the memory area, wherein the identification uniquely identifies the memory area.

9. The method according to claim 3, wherein prior to the initialization of the memory area a successful authentication with respect to security module is possible only when a first certificate is present.

10. The method according to claim 6, wherein the smart meter is associated with configuration data for operating the smart meter and/or the gateway, wherein by way of the smart meter energy consumption-specific measurement data elements can be acquired, wherein the data received from the first computer system contain a statement of those measurement data elements and/or configuration data to which the utility company and or the metering point operator is authorized for read access.

11. The method according to claim 7, wherein the device is associated with the statement in the form of the energy acquisition application.

12. The method according to claim 8, wherein the identification of the memory area is provided by an identification of security module.

13. The method according to claim 10, wherein the data received from the first computer system contain the statement of those measurement data elements and/or configuration data which are transmitted to the second computer system by the smart meter or the device by using the security module.

14. The method according to claim 10, wherein the data received from the first computer system contain a statement concerning the chronological frequency of capturing the measurement data elements by the smart meters and/or a statement about the chronological frequency of the transmission of the measurement data elements and/or configuration data to the second computer system.

15. The method according to claim 11, wherein the statement is contained in the data received from the first computer system in the energy acquisition application, wherein the energy acquisition application monitors the access by the second computer system to the measurement data elements and/or configuration data with the help of the statement.

16. The method according to claim 12, wherein the identification of the security module is a public key of the security module, or an IPv6-address of the security module.

17. A security module, wherein the security module can be associated with a memory area, wherein the memory area can be associated with a smart meter, wherein the security module is designed for initializing the memory area, wherein the security module comprises:
an interface to a first communication channel with a first computer system, wherein the first computer system is associated with a set of computer systems connected by a network;
a processor configured to execute a cryptographic protocol for authenticating the first computer system with respect to the security module, wherein the initialization serves to enable communication between the security module and additional computer systems of the set of computer systems, wherein the security module is designed in such a way, that prior to the initialization of the memory area, a successful authentication with respect to the security module is possible only for the first computer system of the set of computer systems;
wherein the interface is configured to receive data from the first computer system via a secure transmission and the security module is designed to store data in the memory area for initializing the memory area after successful authentication of the first computer system with respect to the security module, wherein the security module is designed in such a way that only based on the stored data, communication is enabled between a second computer system of a utility company and/or metering point operator and the security module by bypassing the first computer system, wherein the second computer system is a computer system belonging to a set of computer systems, and wherein, prior to and subsequent to communication by the second computer system of the utility company and/or metering point operator and the security module being made possible, write access to memory area is possible exclusively for the first computer system of the set of computer systems.

18. The method according to claim 17, wherein the security module is a chip card.

19. A first computer system for initializing a memory area, wherein the memory area is associated with a smart meter, wherein the first computer system comprises:
an interface to a first communication channel between the first computer system and a security module, wherein the security module is associated with the memory area, wherein the first computer system is associated with a set of computer systems connected by a network;
a processor configured to execute a cryptographic protocol for authenticating the first computer system with respect to the security module; and
wherein the interface is configured to transmit data from the first computer system to the security module via a secure transmission for storing the data by the security module in the memory area for initializing the memory area after successful authentication of the first computer system with respect to the security module, wherein the data that are transmitted specify a second computer system of a utility company and/or a metering point operator, wherein the specification of providing access to a communication between the security module and the second computer system has the purpose of bypassing the first computer system, wherein the second computer system is a computer system of a set of computer systems, and wherein, prior to and subsequent to communication by the second computer system of the utility company and/or metering point operator and the security module being made possible, write access to memory area is possible exclusively for the first computer system of the set of computer systems.

20. A method executed on a first computer system for initializing a memory area, wherein the memory area is associated with a smart meter, wherein the method on the first computer system comprises:
establishing a first communication channel between the first computer system and a security module, wherein the security module is associated with the memory area, wherein the first computer system is associated with a set of computers connected by a network;

authenticating the first computer system with respect to the security module, sending data from the first computer system to the security module via a secure transmission for storing the data by the security module in the memory area for initializing the memory area after successful authentication of the first computer system with respect to the security module, wherein by way of the data transmitted, a second computer system of a utility company and/or metering point operator is specified, wherein as a result of the specification, access is granted for a communication between the security module and the second computer system by bypassing the first computer system, wherein the second computer system is a computer system of a set of computer systems, and wherein, prior to and subsequent to communication by the second computer system of the utility company and/or metering point operator and the security module being made possible, write access to memory area is possible exclusively for the first computer system of the set of computer systems.

* * * * *